(No Model.) 2 Sheets—Sheet 1.
T. MARSHALL.
FEED WATER HEATER.
No. 298,105. Patented May 6, 1884.
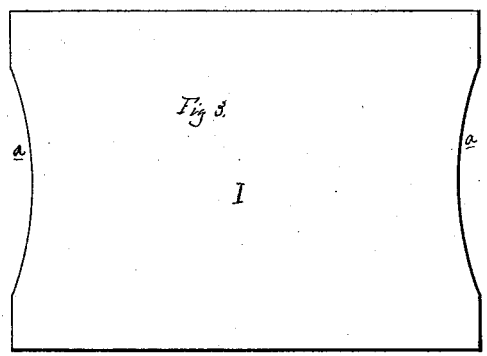
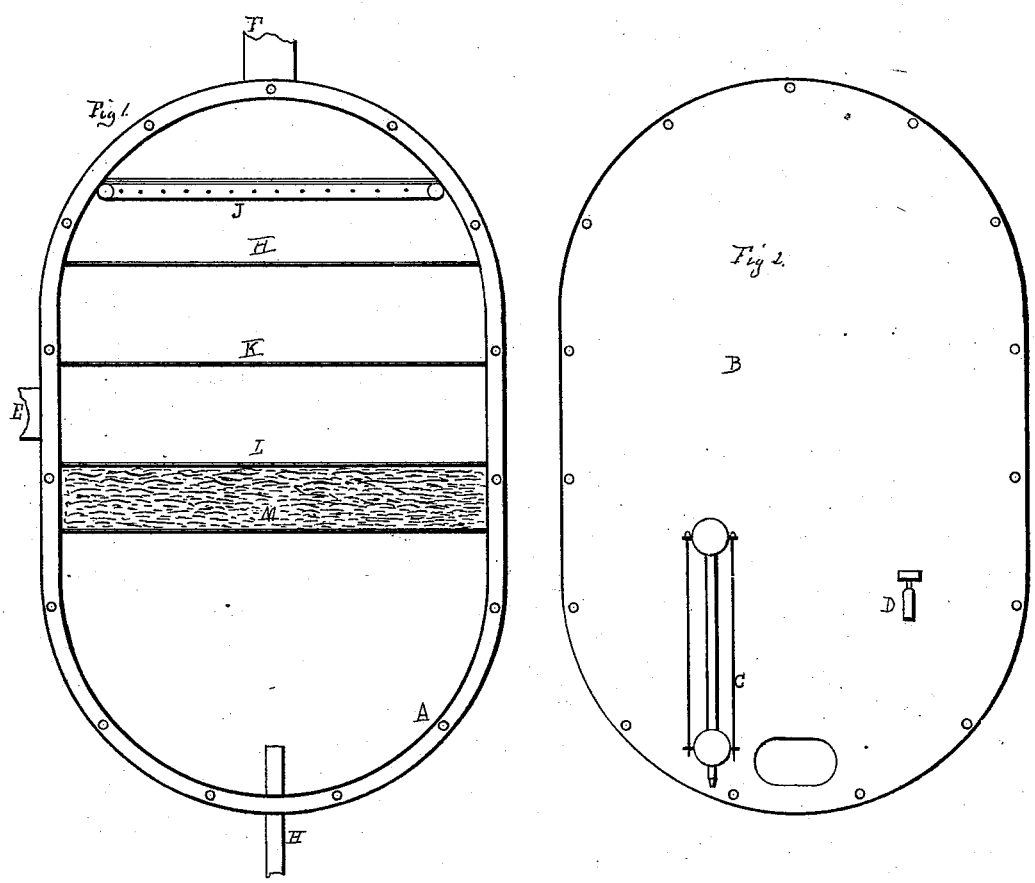
Witnesses.
Inventor (No Model.) 2 Sheets—Sheet 2.
T. MARSHALL.
FEED WATER HEATER.
No. 298,105. Patented May 6, 1884.
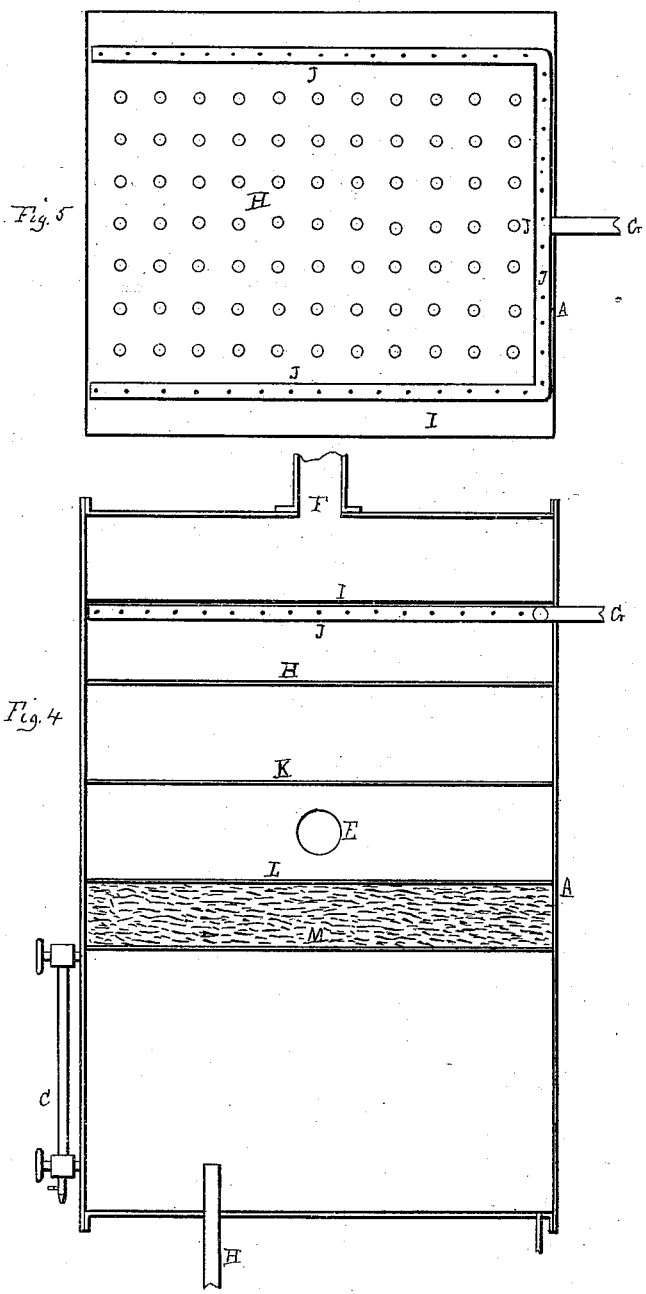

UNITED STATES PATENT OFFICE.

THOMAS MARSHALL, OF DEFIANCE, OHIO.

FEED-WATER HEATER.

SPECIFICATION forming part of Letters Patent No. 298,105, dated May 6, 1884.

Application filed January 16, 1884. (No model.)

*To all whom it may concern:*

Be it known that I, THOMAS MARSHALL, of Defiance, in the county of Defiance and State of Ohio, have invented new and useful Improvements in Feed-Water Heaters; and I do hereby declare that the following is a full, clear, and exact description thereof, reference being had to the accompanying drawings, which form a part of this specification.

This invention relates to certain new and useful improvements in the construction and operation of feed-water heaters of that class which are designed to precipitate lime and other impurities as the water passes through the heater and is subjected to the action of steam therein.

The invention consists in the peculiar construction of the parts and their combinations, all as more fully hereinafter described.

Figure 1 is an elevation with the front cover removed. Fig. 2 is an elevation of the front or cover detached. Fig. 3 is a plan of one of the plates. Fig. 4 is a vertical central section from front to rear. Fig. 5 is a cross-section taken below the upper plate, showing the perferations in the plate below it.

In the accompanying drawings, which form a part of this specification, A represents the shell or body of my improved heater, provided with a detachable front, B, upon which is secured a glass water-gage, C, and through which is a faucet, D, for the purpose of drawing off hot water when desired.

E is an inlet-pipe through which exhaust-steam from the engine is admitted to the interior of the shell, and F is an exhaust-pipe through which a surplus of steam may escape.

G G is the pipe through which the water is admitted to be heated and purified, and H' is a pipe leading from the bottom of the heater, through which the heated and purified water passes to the boiler.

I is an imperforated plate near the top of the chamber and above the inlet-pipe G, and fills the entire space between the walls of the the chamber, except at each end, where it is cut away, as at *a*, to afford an upward passage for steam to reach the exhaust-pipe F. The pipe G enters through the wall of the device, as shown in Figs. 4 and 5, and terminates in a branch, J, which extends around three sides of the chamber, as shown in the latter-named figure. Inside the chamber this pipe G and its branches are provided with numerous perforations, preferably at equal distances apart, through which the feed-water issues in small streams or spray, and in falling it becomes intimately mingled with the ascending steam entering through the inlet E.

H, K, L, and M are perforated shelving or plates, perforated and so constructed as to be removable at will upon taking off the front plate or cover B, the more readily to allow them to be cleaned when necessary. The space between the two lower shelves, L and M, is filled with any suitable filtering material through which water can readily percolate—such as straw, hay, or other vegetable fiber.

In practice, the device having been constructed and made for use as above described, steam is admitted through the inlet E, which, rising, is broken into fine jets in passing through the perforations in the plates H and K, and the water admitted through the pipe G, and falling from the perforations in its branches, is brought into such intimate connection that the rising steam has to become heated to that point where it is ready to part with its lime or other impurities, which will be deposited in the further downward progress of the water through the two lower plates and the filtering material between them, and pass into the chamber at the bottom of the device, whence it may be drawn off as occasion may require the feed to the boiler.

What I claim as my invention is—

1. A feed-heater water consisting of the case A, provided with steam-inlet E and steam-outlet B, the water-inlet G, terminating in perforated branches J, the imperforated plate I, the perforated plates H, K, L, and M, and the outlet water-pipe H', all constructed, arranged, and operating substantially as and for the purposes set forth.

2. A feed-water heater consisting of the case A, provided with steam-inlet E and steam-outlet B, the water-inlet G, terminating in perforated branches J, the imperforated plate I, the perforated plates H, K, L, and M, the outlet water-pipe H', water-gage C, and faucet D, the parts being constructed, arranged, and operating as and for the purposes set forth.

THOMAS MARSHALL.

Witnesses:
F. G. BROWN,
JNO. C. WOODS.